UNITED STATES PATENT OFFICE.

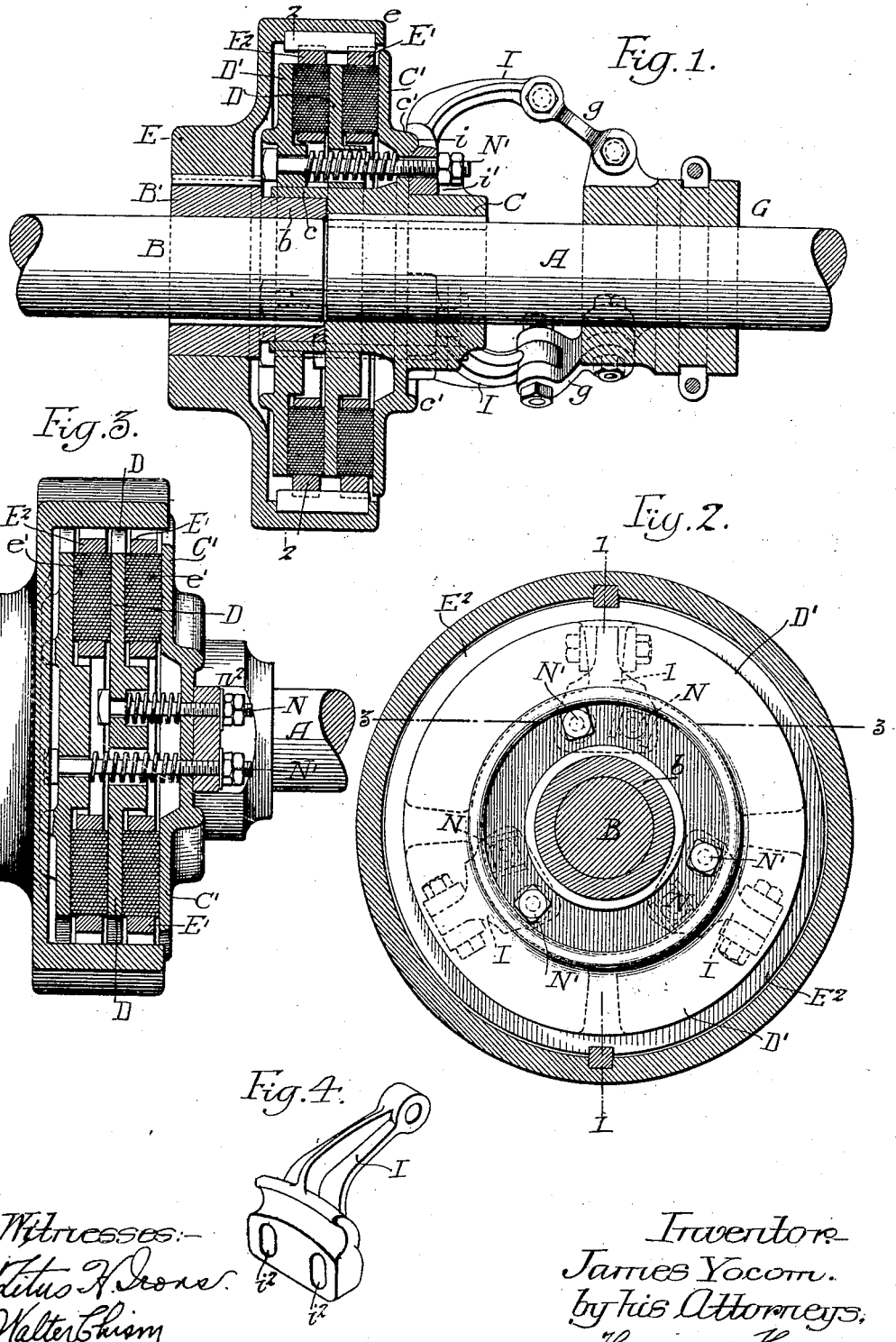

JAMES YOCOM, OF PHILADELPHIA, PENNSYLVANIA.

FRICTION-CLUTCH.

968,308.  Specification of Letters Patent.  Patented Aug. 23, 1910.

Application filed May 11, 1910. Serial No. 560,634.

*To all whom it may concern:*

Be it known that I, JAMES YOCOM, a citizen of the United States, residing in Philadelphia, Pennsylvania, have invented certain Improvements in Friction-Clutches, of which the following is a specification.

The object of my invention is to improve the construction of disk friction clutches in which two or more disks are used so that the gripping disks can be independently drawn into frictional contact, decreasing the strain upon the bolts and making a more effective clutch.

In the accompanying drawings:—Figure 1, is a sectional view of the clutch on the line 1—1, Fig. 2; Fig. 2, is a transverse sectional view on the line 2—2, Fig. 1; Fig. 3, is a sectional plan view on the line 3—3, Fig. 2; and Fig. 4, is a perspective view of one of the levers.

A is one of the shafts on which the clutch is mounted. B is the other shaft in line with the shaft A.

C is a hub mounted on the shaft A and having a flange $c$.

On the shaft B is a collar B' having a reduced extension $b$ which projects into the space formed by the flange $c$ of the hub C. This construction retains the two shafts A and B in alinement. The hub C has an annular flange C' forming one of the friction surfaces and loose on this hub are rings D—D', which also form friction surfaces.

E is a casing secured to the collar B' and has a portion $e$ which extends over and incloses the rings D—D'.

E'—E² are rings which are keyed to the casing E. The ring E' is mounted between the flange C' and the ring D and the ring E² is mounted between the rings D and D'. The rings D and D' are splined to the hub C but are capable of sliding longitudinally thereon and the rings E' and E², while keyed to the casing E, are free to move longitudinally to accommodate themselves to the rings D—D'. Each ring E'—E² has friction blocks $e'$ mounted thereon, as shown in Fig. 1, and these friction blocks extend beyond the surfaces of the rings E'—E², so as to contact directly with the rings D—D' and the flange C'.

G is a sleeve adapted to slide freely on the shaft A and I are levers connected to the sleeve G by links $g$ and fulcrumed at $i$ to a projecting rim $c'$ on the hub. The other arm $i'$ of each lever has two openings $i^2$ arranged side by side and extending through these openings are bolts N—N' having heads $n$—$n'$ respectively. The bolt N extends through the ring D and its head $n$ bears against the back of this ring. A spring $m$ is located between the ring and the hub C, as shown in Fig. 3, so as to hold the ring D away from the friction surfaces of the ring E'. On the bolt are nuts $n^2$ for adjusting the bolt. The head $n'$ of the bolt N' bears against the outer face of the disk D and a spring $m'$ is located between the flange and the hub C; the side disk tending to hold it away from the friction surface of the disk E².

By the above construction it will be seen that the two disks D and D' are independently moved toward their friction surfaces by actuating the levers I. By this construction when the levers are released the springs independently push their respective disks away from the friction surfaces and hold them away until the lever is again operated. When the sleeve is shifted so as to cause the bolts to draw upon the disks, the disks are clamped hard against the friction surfaces making a positive coupling. The springs of the disks D' are preferably much stronger than the springs of the disk D, so that there is comparatively little pressure of the disk D against the friction ring E² when the parts are in the uncoupled position.

The disks are adjusted when they are in the coupled position and the nuts on both bolts drawn up tight will have the desired frictional contact. When the disks are backed off then the disk D' will be forced back by its springs to its full extent, but the spring of the disk D, being lighter, will only bear with a comparatively light pressure against the disk E² and the friction between the disks D, D' and E² will not be sufficient to interfere with the movement of the parts.

I claim:

1. The combination in a clutch, of two shafts, a flanged hub mounted on one shaft, a flanged casing mounted on the other shaft, two sets of friction disks mounted so as to turn with the hub and to slide longitudinally thereon and two disks mounted to turn with the casing and to slide thereon, one of said disks being mounted between the flange of the hub and one of the hub disks, the other disk of the casing being mounted between the two hub disks, with mechanism for moving the said hub disks longitudinally and independently of one another, and springs for independently returning the disks to their normal position.

2. The combination in a clutch, of two shafts, a hub secured to one shaft, a casing secured to the other shaft, two disks adapted to turn with but slide longitudinally upon the hub and two disks arranged to turn with and slide upon the casing, said hub having a flange, operating levers, and two sets of bolts connected to each of said levers, one set of bolts having heads adapted to bear against the first disk from the levers, the other set of bolts extending through the first disk and having heads adapted to bear against the second disk.

3. The combination in a clutch, of two shafts, a hub secured to one shaft, a casing secured to the other shaft, two disks adapted to turn with but slide longitudinally upon the hub and two disks arranged to turn with and slide upon the casing, said hub having a flange, operating levers, two sets of bolts connected to each of said levers, one set of bolts having heads adapted to bear against the first disk from the levers, the other set of bolts extending through the first disk and having heads adapted to bear against the second disk, and a spring mounted between the hub and the second disk.

In testimony whereof, I have signed my name to this specification, in the presence of two subscribing witnesses.

JAMES YOCOM.

Witnesses:
 WM. E. SHUPE,
 WM. A. BARR.